(12) United States Patent
Nomura

(10) Patent No.: US 8,836,856 B2
(45) Date of Patent: Sep. 16, 2014

(54) IMAGING UNIT WITH PRISMS AND IMAGE SENSOR

(71) Applicant: Hoya Corporation, Tokyo (JP)

(72) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 98 days.

(21) Appl. No.: 13/669,656

(22) Filed: Nov. 6, 2012

(65) Prior Publication Data

US 2013/0113979 A1    May 9, 2013

(30) Foreign Application Priority Data

Nov. 8, 2011 (JP) .................................. 2011-244813

(51) Int. Cl.

| | |
|---|---|
| *H04N 5/225* | (2006.01) |
| *H04N 5/232* | (2006.01) |
| *G02B 13/00* | (2006.01) |
| *H04N 5/374* | (2011.01) |
| *G03B 17/17* | (2006.01) |
| *G02B 7/10* | (2006.01) |
| *G02B 17/04* | (2006.01) |
| *G02B 15/177* | (2006.01) |

(52) U.S. Cl.
CPC ............. *H04N 5/232* (2013.01); *H04N 5/2257* (2013.01); *H04N 5/2254* (2013.01); *G02B 13/0065* (2013.01); *H04N 5/374* (2013.01); *G03B 17/17* (2013.01); *G02B 7/102* (2013.01); *G02B 13/009* (2013.01); *G02B 17/04* (2013.01); *G02B 15/177* (2013.01)
USPC .......................................... 348/374; 348/335

(58) Field of Classification Search
None
See application file for complete search history.

(56) References Cited

U.S. PATENT DOCUMENTS

| | | | | |
|---|---|---|---|---|
| 3,791,274 | A * | 2/1974 | Hansen ......................... | 396/351 |
| 6,018,416 | A * | 1/2000 | Mihara ......................... | 359/423 |
| 6,560,013 | B1 * | 5/2003 | Ramsbottom ................. | 359/431 |
| 6,801,370 | B2 * | 10/2004 | Sekiyama et al. ............ | 359/726 |

(Continued)

FOREIGN PATENT DOCUMENTS

| | | |
|---|---|---|
| JP | 2004-355010 | 12/2004 |
| JP | 2007-006318 | 1/2007 |
| JP | 2008-242446 | 10/2008 |
| JP | 2009-116074 | 5/2009 |

OTHER PUBLICATIONS

U.S. Appl. No. 13/231,087 to Okuda, filed on Sep. 13, 2011.
U.S. Appl. No. 12/036,459 to Nomura, filed on Feb. 25, 2008.

*Primary Examiner* — Twyler Haskins
*Assistant Examiner* — Wesley J Chiu
(74) *Attorney, Agent, or Firm* — Greenblum & Bernstein P.L.C.

(57) ABSTRACT

An imaging unit includes an incident-side optical system; an incident-side prism including a first incident surface which is orthogonal to the optical axis of the incident-side optical system, a first reflecting surface and a first exit surface; an exit-side prism including a second incident surface, a second reflecting surface and a second exit surface which is orthogonal to the optical axis and from which light rays reflected by the second reflecting surface emerge; and an image sensor which receives light rays that emerge from the second exit surface. The first incident surface is positioned closer to the photographic object than the second exit surface. A deflection angle of parallel light rays, on the optical axis, at the first reflecting surface is greater than 90°, and a deflection angle of the parallel light rays at the second reflecting surface is smaller than 90°.

7 Claims, 4 Drawing Sheets

(56) References Cited

U.S. PATENT DOCUMENTS

| | | | |
|---|---|---|---|
| 6,850,279 B1* | 2/2005 | Scherling | 348/335 |
| 7,554,597 B2* | 6/2009 | Scherling | 348/335 |
| 7,583,289 B2* | 9/2009 | Hovanky et al. | 348/61 |
| 7,585,121 B2* | 9/2009 | Tsai | 396/351 |
| 7,616,393 B2* | 11/2009 | Border et al. | 359/834 |
| 8,395,854 B2* | 3/2013 | Takakubo et al. | 359/737 |
| 8,416,508 B2* | 4/2013 | Saori et al. | 359/726 |
| 2003/0076436 A1* | 4/2003 | Otake et al. | 348/335 |
| 2006/0017834 A1* | 1/2006 | Konno et al. | 348/335 |
| 2006/0028734 A1* | 2/2006 | Kuiper et al. | 359/676 |
| 2006/0061871 A1* | 3/2006 | Ophey | 359/676 |
| 2006/0092524 A1* | 5/2006 | Konno | 359/678 |
| 2008/0291543 A1* | 11/2008 | Nomura et al. | 359/676 |
| 2010/0328420 A1* | 12/2010 | Roman | 348/14.08 |
| 2011/0043683 A1* | 2/2011 | Beach et al. | 348/373 |
| 2011/0292199 A1* | 12/2011 | Lapstun et al. | 348/79 |
| 2012/0075518 A1* | 3/2012 | Okuda | 348/340 |
| 2012/0249815 A1* | 10/2012 | Bohn et al. | 348/208.99 |
| 2013/0278785 A1* | 10/2013 | Nomura et al. | 348/208.11 |
| 2014/0048684 A1* | 2/2014 | Barkan et al. | 250/208.1 |

* cited by examiner

IMAGING UNIT WITH PRISMS AND IMAGE SENSOR

BACKGROUND OF THE INVENTION

1. Field of the Invention

The present invention relates to an imaging unit which includes an imaging optical system and an image sensor.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to have the capability of taking such photographic images as a subsidiary function, such as mobile phones equipped with a camera and personal digital assistants (PDAs) equipped with a camera, have become widespread. In these types of mobile electronic devices, it is common to provide the mobile electronic device therein with an imaging unit which is structured such that an image sensor and a photographing optical system for leading light emanating from a photographic object (object-emanated light) to the image sensor are accommodated in a hollow housing of the imaging unit.

FIG. 6 shows an imaging unit of the related art.

This imaging unit 100 is provided with a hollow housing 101. A first lens element 102 is fixed to an end of the housing 101 on the object side (front side) in an exposed manner. An incident-side prism 103, a second lens group 104 and a third lens group 105 are fixed inside an internal space of the housing 101. The incident-side prism 103 is positioned immediately behind the first lens element 102 (the intersecting angle between the incident surface 103a and the exit surface 103c of the incident-side prism 103 is 90°), and the second lens group 104 faces the exit surface 103c of the incident-side prism 103. An exit-side prism 106 is fixed to the housing 101 in the internal space thereof at the opposite end of this internal space from the incident-side prism 103 (the intersecting angle between the incident surface 106a and the exit surface 106c is 90°). In addition, although not shown in FIG. 6, an optical element is installed between the third lens group 105 and the exit-side prism 106. An image sensor (image pickup device) 107 is fixed immediately in front of the exit-side prism 106. Additionally, the front of the housing 101 except an end portion of the front on the first lens element 102 side is entirely open, and this front opening is closed by a circuit board 108 to which the image sensor 107 is mounted. Additionally, a cover 109 covers this front opening of the housing 101 from the front to prevent the circuit board 108 from coming off the front opening of the housing 101.

Light rays, which are reflected by a photographic object (object to be photographed; not shown) positioned in front of the imaging unit 100, to be incident on the first lens element 102 pass through the first lens element 102 rearwardly (downwardly with respect to FIG. 6) to be incident on the incident surface 103a of the incident-side prism 103. Subsequently, the light rays incident on the incident surface 103a emerge from the exit surface 103c of the incident-side prism 103 after being reflected by a reflecting surface 103b of the incident-side prism 103 in an orthogonal direction (direction orthogonal to the optical axis of the first lens element 102). Subsequently, the light rays emerging from the exit surface 103c pass through the second lens group 104, the third lens group 105 and the aforementioned optical element (not shown) to be incident on the incident surface 106a of the exit-side prism 106. The light rays incident on the incident surface 106a are reflected forward by a reflecting surface 106b of the exit-side prism 106 to be captured (received) by the image sensor 107 (imaging surface thereof) after emerging from an exit surface 106c of the exit-side prism 106.

An example of the above-described related art (shown in FIG. 6) is disclosed in Japanese Unexamined Patent Publication No. 2008-242446. Other examples of bending optical systems are disclosed in Japanese Unexamined Patent Publication Nos. 2004-355010, 2007-6318 and 2009-116074.

Although the demand to slim down this type of imaging unit has become stronger, there is no choice but to use a large image sensor that has a large thickness as the image sensor 107 because the demand for an increased number of pixels (demand for higher resolution) in imaging units has also been very high. On the other hand, the first lens element 102 can be slimmed down while meeting the demand to increase the number of pixels of the image sensor 107 (demand for higher resolution) in imaging units by increasing the refractive power of the first lens element 102 or making an adjustment to the power of the first lens element 102. Therefore, if the position of the rear surface (exit surface) of the slimmed-down first lens element 102 and the position of the rear surface of the large image sensor (107) that has a large thickness in the forward/rearward direction are made to be substantially coincident with each other (if the position of the incident surface 103a of the incident-side prism 103 and the position of the exit surface 106c of the exit-side prism 106 in the forward/rearward direction are made to be substantially coincident with each other so as to substantially lie on a common plane), the cover plate 109 is positioned further forward (closer to the object side) relative to the front surface of the first lens element 102 (consequently forming a large projection and a large depression on the front of the imaging unit 100), which makes it impossible to slim down the entire imaging unit 100 even though the first lens element 102 is slimmed down.

SUMMARY OF THE INVENTION

The present invention provides an imaging unit which can entirely be slimmed down with no need to form a large depression and a large projection on the object-side surface of the imaging unit and can also make all the effective light rays which emerge from the exit surface of the incident-side prism incident on the incident surface of the exit-side prism even in the case where the imaging unit is provided with an imaging optical system which bends object-emanated light rays in the shape of a substantially letter U and where the image sensor cannot be sufficiently slimmed down with respect to the thickness of a slimmed-down incident-side optical system.

According to an aspect of the present invention, an imaging unit is provided, including an incident-side optical system on which light rays reflected from a photographic object are incident; an incident-side prism including a first incident surface which is orthogonal to an optical axis of the incident-side optical system and on which the light rays that are passed through the incident-side optical system are incident, a first reflecting surface which reflects the light rays incident thereon, and a first exit surface from which the light rays reflected by the first reflecting surface emerge; an exit-side prism including a second incident surface onto which the light rays that emerge from the first exit surface are incident, a second reflecting surface which reflects the light rays incident thereon in a direction toward the photographic object, and a second exit surface from which the light rays reflected by the second reflecting surface emerge; and an image sensor which faces the second exit surface and receives the light rays that emerge from the second exit surface. The first incident surface is positioned closer to the photographic object side than the second exit surface. A deflection angle of parallel light rays that travel along and parallel to the optical axis, of the incident-side optical system, at the first reflecting surface is greater than 90°, and a deflection angle of the parallel light rays at the second reflecting surface is smaller than 90°.

It is desirable for the deflection angle of the parallel light rays at the first reflecting surface to be an angle of 90°+α°, and for the deflection angle of the parallel light rays by the second reflecting surface to be an angle of 90°−α°.

It is desirable for an intersecting angle between the first reflecting surface and the first exit surface to be an angle of 45°+α°/2, and for an intersecting angle between the second incident surface and the second reflecting surface is an angle of 45°−α°/2.

It is desirable for the imaging unit to include a housing having an internal space in which the incident-side optical system, the incident-side prism, the exit-side prism and the image sensor are accommodated. The incident-side prism and the exit-side prism oppose a base wall of the housing in the internal space. The incident-side optical system is positioned on an opposite side of the incident-side prism from the base wall. The image sensor is positioned on an opposite side of the exit-side prism from the base wall. The parallel light rays which emerge from the first exit surface to travel toward the second incident surface is inclined with respect to the first incident surface in such a manner as to gradually approach the base wall in a direction toward the second incident surface.

It is desirable for the incident-side optical system to be a lens element.

It is desirable for the imaging unit to include at least one optical element between the incident-side prism and the exit-side prism.

It is desirable for the first exit surface of the incident-side prism and the second incident surface of the exit-side prism to lie on planes that are mutually parallel to each other.

It is desirable for the second reflecting surface of the exit-side prism to reflect the light rays incident thereon in a direction parallel to the optical axis toward the photographic object, and for the second exit surface of the exit-side prism to lies in a plane that is orthogonal to the optical axis.

The imaging unit according to the present invention can lead object-emanated light rays to the image sensor after bending the object-emanated light rays in the shape of a substantially letter U because the imaging unit is equipped with an imaging optical system which includes an incident-side optical system, an incident-side prism and an exit-side prism.

In addition, since the first incident surface of the incident-side prism is positioned closer to the object side than the second exit surface of the exit-side prism, even if an image sensor and other members (e.g., a circuit board, a packing, etc.) are arranged on the object side of the exit-side prism in the case where the image sensor cannot be sufficiently slimmed down with respect to the thickness of the incident-side optical system that is formed thinner than image sensors of the related art, it is possible to slim down the entire imaging unit with no need to form a large projection and a large depression on a surface of the imaging unit on the object side.

Additionally, since the deflection angle of object-emanated light by the first reflecting surface is greater than 90° while the deflection angle of object-emanated light by the second reflecting surface is smaller than 90°, all the effective light rays which emerge from the first exit surface of the incident-side prism can be made incident on the second incident surface of the exit-side prism even though the incident-side prism (an end of the first exit surface thereof on the object side) is positioned closer to the object side than the exit-side prism (an end of the second incident surface thereof on the object side).

The present disclosure relates to subject matter contained in Japanese Patent Application No. 2011-244813 (filed on Nov. 8, 2011) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
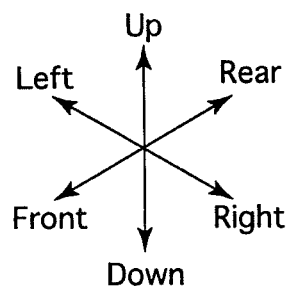
FIG. 1 is a front perspective view of an embodiment of an imaging unit according to the present invention, viewed obliquely from above.
Figure 1:
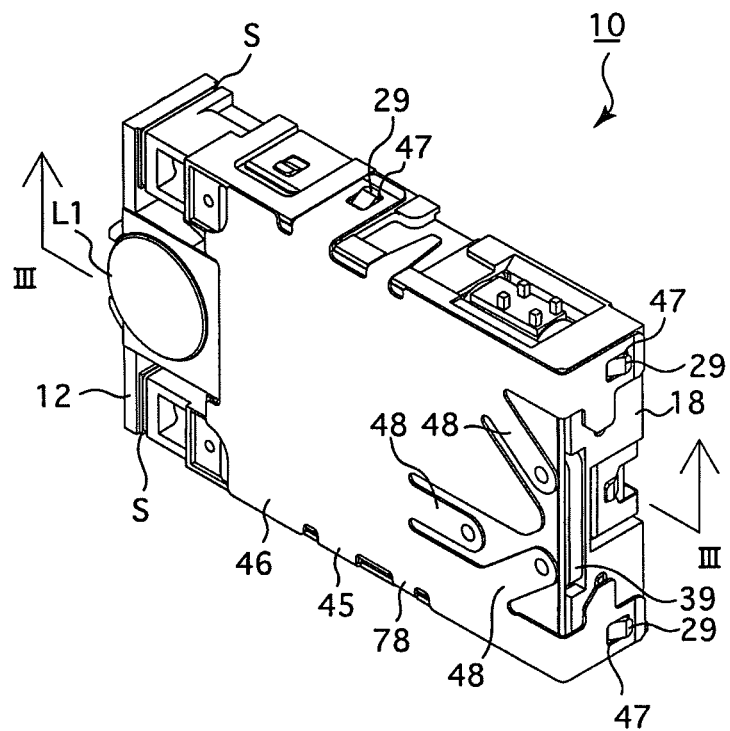

An embodiment of an imaging unit according to the present invention will be discussed below with reference to FIGS. 1 through 5. In the following descriptions, forward and rearward directions, leftward and rightward directions, and upward and downward directions are determined with reference to the directions of the double-headed arrows shown in the drawings.

Figure 2:
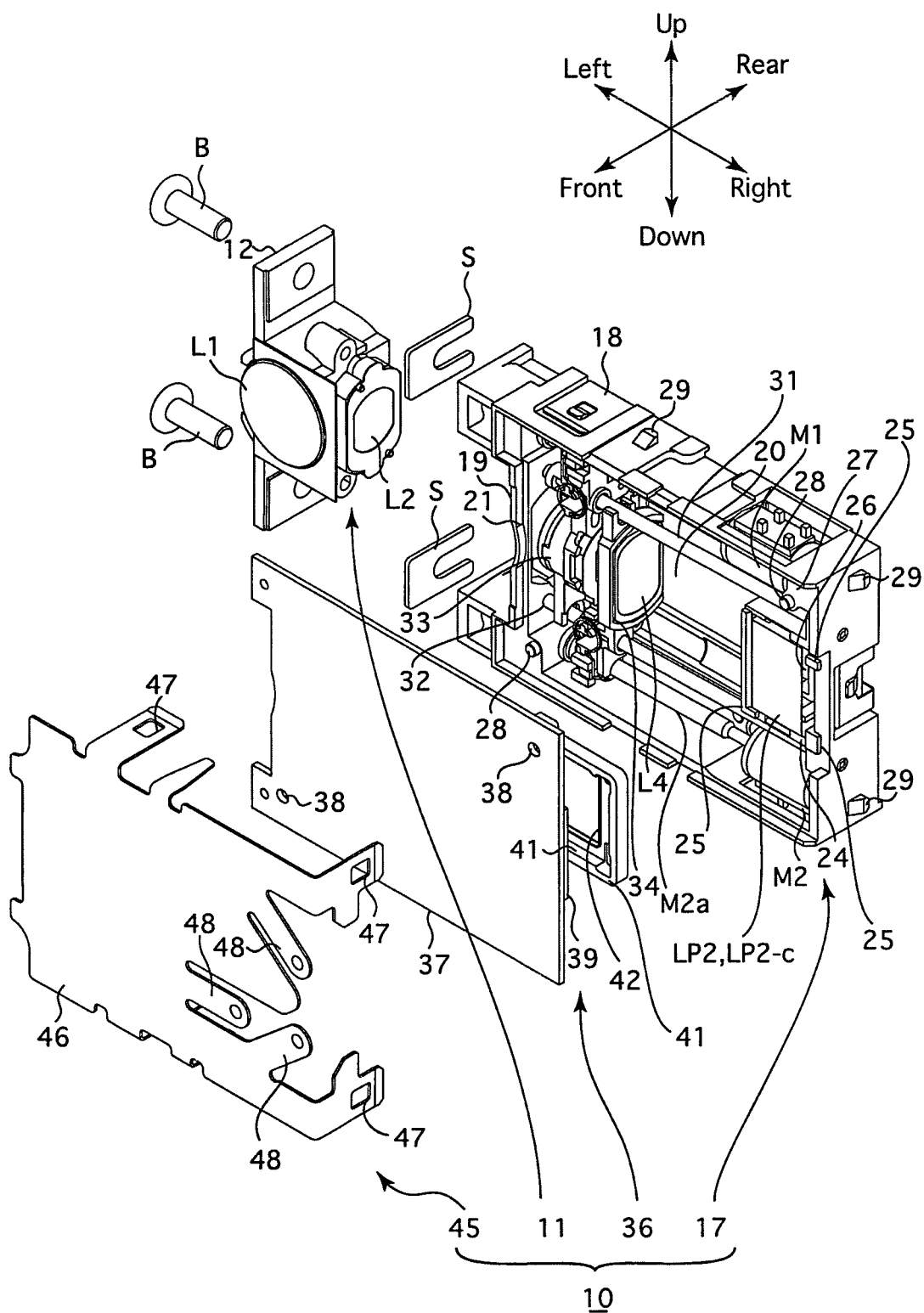
FIG. 2 is a front exploded perspective view of the imaging unit, viewed obliquely from above.

As shown in FIGS. 1 and 2, the imaging unit 10 is provided with a first lens group unit 11, a body module 17, a board module 36 and a cover 45 that constitute the major components of the imaging unit 10.

The first lens group unit 11 is provided with a holder 12 formed as a synthetic-resin molded product. A prism accommodating space 13 which is open at the front and right sides is formed in the holder 12. The holder 12 is provided at the front opening of the prism accommodating space 13 with a front lens holding hole 14, and is provided at the right opening of the prism accommodating space 13 with a right lens holding hole 15 (see FIG. 3).

A lens (incident-side optical system) L1 which is circular in outer shape and an optical axis A1 of which extends in the forward/rearward direction is fitted into the front lens holding hole 14 and fixed therein.

Figure 3:
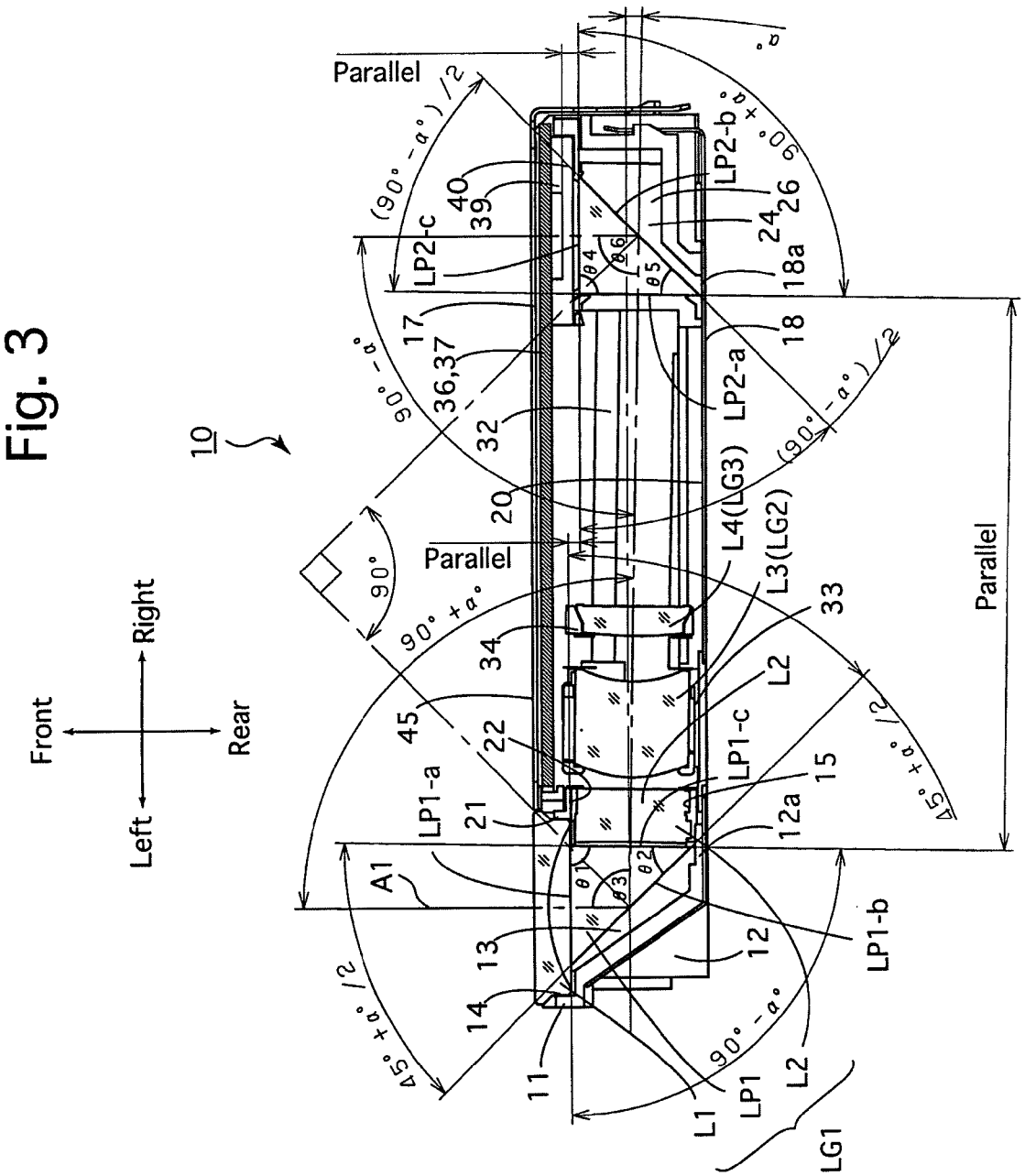
FIG. 3 is a cross sectional view taken along the line shown in FIG. 1.

The holder 12 is provided in the prism accommodating space 13 with a first prism (incident-side prism) LP1 that is fit-engaged in the prism accommodating space 13 and fixed thereto. The first prism LP1 is provided with a flat first incident surface LP1-$a$ which is orthogonal to the forward/rearward direction (i.e., orthogonal to the optical axis A1), a flat first reflecting surface LP1-$b$ which is inclined with respect to the first incident surface LP1-$a$, and a flat first exit surface LP1-$c$. As shown in FIG. 3, the first incident surface LP1-$a$ faces the exit surface of the lens element L1 in the forward/rearward direction. In a plan view (bottom plan view) in the FIG. 3, the intersecting angle θ1 between the first incident surface LP1-$a$ and the first exit surface LP1-$c$ is 90°−α°

($5 \geq \alpha > 0$) and the intersecting angle θ2 between the first reflecting surface LP1-*b* and the first exit surface LP1-*c* is 45°−α°/2.

The first lens group unit 11 is provided with a lens element L2 made of resin which is fitted into the right lens holding hole 15 of the holder 12 and fixed thereto (see FIG. 3). The optical axis of the lens element L2 is aligned (coincides) with an optical axis A2, defined by the optical axis A1 that is deflected at the first reflection surface LP1-*b* by an angle of 90°+α°. The optical axis of the lens element L2 (and hence the optical axis A2) is inclined, with respect to a straight line extending in the leftward/rightward direction (i.e., a straight line which is angled relative to the optical axis of the lens element L1 at an angle of 90°), at a predetermined inclination angle in such a manner as to gradually proceed rearward in a direction from left to right. This predetermined inclination angle is α° (shown in FIG. 3).

As described above, the lens element L1, the first prism LP1 and the lens element L2 are elements of the first lens group LG1. The holder 12 and the first lens group LG1 are elements of the first lens group unit 11.

The body module 17 is provided with a housing 18 made of synthetic resin. The housing 18 is provided at the front left end thereof with a mounting recess 19. In addition, the housing 18 is provided, on the front side thereof in a section positioned on the right side of the mounting recess 19, with an accommodating recess (internal space) 20 that has a substantially rectangular in cross sectional shape. The housing 18 is provided between the mounting recess 19 and the accommodating recess 20 with a partition wall 21. The housing 18 is provided at a center of the partition wall 21 with a communication hole (through-hole) 22 (see FIG. 3) via which the mounting recess 19 and the accommodating recess 20 are communicatively connected with each other. The housing 18 is provided, in the accommodating recess 20 at the right end of the base surface thereof, with a positioning portion 24 having a substantially rectangular shape, in a front view, which projects forward from the base of the accommodating recess 20 (i.e., from a front surface of the base surface in the accommodating recess 20). The positioning portion 24 is provided on a front surface thereof with three spacers 25 which project forward. The front end surfaces of the three spacers 25 are formed as flat positioning surfaces which lie in a common plane orthogonal to the forward/rearward direction (i.e., the direction of the thickness of the housing 18). In addition, the housing 18 is provided in the positioning portion 24 with a prism mounting recess 26 which is open at the front and left sides. The housing 18 is provided, around the front edge of the inner peripheral surface of the accommodating recess 20, with a board support surface 27 which is positioned behind the frontmost end of the housing 18 and lies in a plane orthogonal to the forward/rearward direction. The housing 18 is further provided, on the board support surface 27 at two different positions thereon, with two lock projections 28, respectively, which project forward from the board support surface 27. In addition, the housing 18 is provided on the right side thereof with two engaging projections 29, and is provided with one engaging projection 29 on each of the upper and lower sides (upper and lower projections) of the housing 18, respectively (the lower projection 29 is not shown in either FIG. 1 or 2).

The body module 17 is provided in the prism mounting recess 26 with a second prism (exit-side prism) LP2 that is fit-engaged into the prism mounting recess 26 and fixed thereto. The second prism LP2 has a flat second incident surface LP2-*a*, a flat second reflecting surface LP2-*b* which is inclined with respect to the second incident surface LP2-*a*, and a flat second exit surface LP2-*c* which is orthogonal to the forward/rearward direction (orthogonal to the optical axis A1). As shown in FIG. 3, a base wall 18*a* of the housing 18, with which the lower end of the second incident surface LP2-*a* of the second prism LP2 is in contact, is smaller in thickness than a base wall 12*a* of the holder 12 that is positioned immediately behind the lower end of the first exit surface LP1-*c* of the first prism LP1. In a plan view (bottom plan view), the intersecting angle 84 between the second incident surface LP2-*a* and the second exit surface LP2-*c* is 90°+α° and the intersecting angle θ5 between the second incident surface LP2-*a* and the second reflecting surface LP2-*b* is 45°−α°/2, as shown in FIG. 3. In addition, the second exit surface LP2-*c* of the second prism LP2 is positioned rearward relative to the first incident surface LP1-*a* of the first prism LP1 with respect to the forward/rearward direction.

The body module 17 is provided with a first rod 31 and a second rod 32 which extend linearly in the leftward/rightward direction. The first rod 31 and the second rod 32 are each fixed at both ends thereof to an inner surface of the right side wall of the housing 18 and the partition wall 21 so that the first rod 31 and the second rod 32 are aligned in the upward/downward direction. As shown in FIG. 3, both the axes of the first rod 31 and the second rod 32 (in FIG. 3 the first rod 31 is hidden behind the second rod 32, thus being invisible) are inclined, with respect to a straight line extending in the leftward/rightward direction, at an inclination angle α° in such a manner as to gradually proceed rearward in a direction from left to right.

The body module 17 is provided on the first rod 31 and the second rod 32 with a second lens group frame 33 and a third lens group frame 34 positioned on the right-hand side of the second lens group frame 33. Upper parts of the second lens group frame 33 and the third lens group frame 34 are slidably supported by the first rod 31, while lower parts of the second lens group frame 33 and the third lens group frame 34 are slidably supported by the second rod 32. A lens element (a second lens group LG2) L3 and a lens element (third lens group LG3) L4 are fixedly fitted into support holes of the second lens group frame 33 and the third lens group frame 34, respectively. The body module 17 is provided with a first motor M1 which is fixed to the housing 18 in the upper part of the accommodating recess 20, and is further provided with a second motor M2 which is fixed to the housing 18 in the lower part of the accommodating recess 20. The first motor M1 and the second motor M2 are stepping motors which are mutually identical in specifications. The first motor M1 is provided with a rotary drive shaft (lead screw) (not shown) which extends linearly leftwards, the rotary drive shaft is screw-engaged with the female screw hole of a driven nut (not shown) which is integral with the second lens group frame 33, and a rotary drive shaft M2*a* of the second motor M2 is screw-engaged with the female screw hole of a driven nut (not shown) which is integral with the third lens group frame 34. Accordingly, forward and reverse rotations of the rotary drive shaft that are caused by forward and reverse rotations of the first motor M1 cause the second lens group frame 33 (the second lens group LG2) to move linearly between the telephoto extremity position (shown in FIG. 3) and the wide-angle extremity position (not shown) in the leftward/rightward direction along the first rod 31 and the second rod 32, and forward and reverse rotations of the rotary drive shaft M2*a* that are caused by forward and reverse rotations of the second motor M2 cause the third lens group frame 34 (the third lens group LG3) to move linearly between the telephoto extremity position (shown in FIG. 3) and the wide-angle extremity position (not shown) in the leftward/rightward direction along the first rod 31 and the second rod 32. The housing 18, the first rod 31, the second rod 32, the second lens group LG2, the third lens group LG3, the second prism LP2, the first motor M1 and the second motor M2, which have been described above, are elements of the body module 17.

The first lens group unit 11 and the body module 17 are fixed to each other by a pair of set screws B with a right portion of the holder 12 (to which the lens element L2 is fixed) fitted into the mounting recess 19 and with a pair of (upper and lower) spacers S held between upper and lower parts of the holder 12 and the upper and lower left end surfaces of the housing 18 (that are the left end surfaces of a pair of projections of the housing 18 which are formed on the vertically opposite sides of the mounting recess 19). Upon the first lens group unit 11 and the body module 17 being fixed to each other, the right end of the holder 12 (in which the right lens holding hole 15 is formed) is fitted into the communication hole 22 of the partition wall 21 of the housing 18, and the optical axis of the lens element L2 coincides with the optical axis of the second lens group LG2 and the third lens group LG3 (the optical axis of the lens element L2, the second lens group LG2 and the third lens group LG3 is inclined with respect to a straight line extending in the leftward/rightward direction at an angle α°). In addition, the rear surface of the holder 12 and the rear surface of the housing 18 lie in a common plane as shown in FIG. 3.

The first lens group LG1, the second lens group LG2, the third lens group LG3 and the second prism LP2 that have been described above are elements of a photographing optical system (bending optical system). This photographing optical system performs a zooming operation by moving the second lens group LG2 (the lens element L3) and the third lens group LG3 (the lens element L4) along the first rod 31 and the second rod 32 and performs a focusing operation by moving the third lens group LG3 along the first rod 31 and the second rod 32.

The board module 36 is provided with a circuit board 37. The circuit board 37 is substantially identical in front shape to the accommodating recess 20 of the housing 18 and is configured from a flat plate that is orthogonal to the forward/rearward direction. The circuit board 37 is provided on the rear surface thereof with a printed circuit (not shown), and two circular holes 38 are formed through two diagonally opposite corners of the circuit board 37, respectively.

The board module 36 is provided with an image sensor (image pickup device) 39 which is fixed at the right end of the rear surface of the circuit board 37. A plurality of terminals (not shown) of the image sensor 39 are fixedly connected to the aforementioned printed circuit. The image sensor 39 is provided on the rear thereof with an imaging surface (not shown) that is orthogonal to the forward/rearward direction. In addition, the image sensor 39 is provided, on the incident surface (the rear surface in the drawings), with a cover glass 40 which is made of a flat glass plate and fixedly installed so as to cover the entire imaging surface of the image sensor 39.

A rear surface (rear end) of the image sensor 39 is covered with a packing 41, made of an elastic material, which has an exposing hole (through-hole) 42, through which the entire imaging surface of the image sensor 69 is rearwardly exposed. The packing 41 is further provided around the exposing hole 42 with three through-holes, through which the three spacers 25 pass to project forward, respectively. The above-described circuit board 37, image sensor 39 and packing 41 are components of the board module 36.

The cover 45 is a press-molded sheet metal product and is provided with a base 46, three pressure leaves 48 and a plurality of resilient engaging lugs which extend rearward from the outer edge of the base 46, and an engaging hole 47 is formed through four of the resilient engaging lugs.

To install the board module 36 and the cover 45 to the body module 17, first the front opening of the accommodating recess 20 is closed by the circuit board 37 so that the outer edge of the rear surface of the circuit board 37 comes into surface contact with the board support surface 27 while the two circular holes 38 of the circuit board 37 are brought into engagement with the two lock projections 28 of the housing 18 (thereupon, the front surface of the circuit board 37 and the front surface of the housing 18 substantially lie in a common plane). Thereupon, the three spacers 25 of the housing 18 forwardly pass through the aforementioned three through-holes of the packing 41 to come in surface contact with a flat rear surface of the cover glass 40 (at the outer periphery of a rear surface portion of the cover glass 40 immediately behind the imaging surface of the image sensor 39) to thereby form a clearance in the forward/rearward direction between the cover glass 40 and the second prism LP2 (the second exit surface LP2-c). In addition, the imaging surface of the image sensor 39 faces the second exit surface LP2-c of the second prism LP2 in the forward/rearward direction through the exposing hole 42. Additionally, a rear surface of the packing 41 comes in contact with the front surface of the positioning portion 24. Subsequently, the base 46 of the cover 45 fully covers, from the front, the front of the housing 18 to fix the cover 45 to the housing 18 by engaging the engaging holes 47 of the four resilient engaging lugs of the cover 45 with the corresponding engaging projections 29, respectively.

Upon the imaging unit 10 being assembled in the above described manner, the circuit board 37 and the image sensor 39 are pressed rearward due to pressure projections which project rearward from rear surfaces of the three pressure leaves 48 to come in contact with a right-hand side portion of the front surface of the circuit board 37 so that a pressing force (biasing force) in the rearward direction acts on the front side of the circuit board 37 from the three pressure leaves 48 (via the aforementioned pressure projections) that slightly resiliently deform in the forward direction. Thereupon, an integral combination of the circuit board 37 and the image sensor 39 is held from the front and the rear sides thereof between the three spacers 25 of the housing 18 and the three pressure leaves 48 (the aforementioned pressure projections) of the cover 45, and accordingly, the circuit board 37 and the image sensor 39 are precisely positioned with respect to the housing 18 and the second prism LP2 in the forward/rearward direction by the three spacers 25 and the three pressure leaves 48 (the aforementioned pressure projections).

If the imaging unit 10 is directed toward a photographic object (object to be photographed) located in front of the imaging unit 10, light reflected by the photographic object (light rays emanating from the photographic object) travels rearward to be incident on the lens element L1, enters the first prism LP1 through the first incident surface LP1-a perpendicularly thereto after passing through the lens element L1 along the optical axis A1, and is reflected (deflected) at an angle of 90°+α° by the first reflecting surface LP1-b of the first prism LP1 so that the light incident on the first prism LP1 changes the traveling direction thereof to travel toward the first exit surface LP-1c (see θ3 in FIG. 3). Subsequently, the reflected light that emerges from the first exit surface LP1-c perpendicularly thereto enters the second prism LP2 through the second incident surface LP2-a perpendicularly thereto after passing through the lenses L2 through L4. Namely, the optical axis A2 (which is defined by the optical axis A1 that is deflected at the first reflection surface LP1-b by the angle of 90°+α°) extending from the first exit surface LP1-c toward the second incident surface LP2-*a* is aligned (coincident) with the optical axis of the lens elements L2 through L4, and is inclined, with respect to a straight line extending in the leftward/rightward direction, at an inclination angle α° in such a manner as to approach the base wall 18*a* gradually in the direction toward the second incident surface LP2-*a*. This light (travelling from the first exit surface LP1-*c*) that is made incident on the second incident surface LP2-*a* is reflected (deflected) at an angle of 90°−α° by the second reflecting surface LP2-*b* of the second prism LP2 so that the light incident on the second prism LP2 changes the traveling direction thereof to travel forwardly, toward the second exit surface LP-2*c* (see θ6 in FIG. 3). Subsequently, this light reflected by the second reflecting surface LP2-*b* emerges forwardly from the second exit surface LP2-*c* perpendicularly thereto, passes through the exposing hole 42 and the cover glass 40 and is captured (received) by the aforementioned imaging surface of the image sensor 39.

The above described embodiment of the imaging unit 10 can lead object-emanated light rays to the image sensor 39 after bending the light rays into the shape of a substantially letter U because the imaging unit 10 is equipped with an imaging optical system (bending optical system) which includes the lens element L1, the first prism LP1 and the second prism LP2.

In addition, since the image sensor 39, the circuit board 37, the packing 41 and the cover 45 are arranged immediately in front of the second prism LP2 with the first incident surface LP1-*a* of the first prism LP1 positioned in front of the second exit surface LP2-*c* of the second prism LP2 in the forward/rearward direction, the front surface of the lens element L1 and the cover 45 can be made to lie substantially in a common plane even in the case where the image sensor 39 cannot be sufficiently slimmed down with respect to the thickness of the lens element L1 that is formed thinner than before. This makes it possible to slim down the entire imaging unit 10 with no need to form a large projection and a large depression on the front surface of the imaging unit 10.

Figure 4:
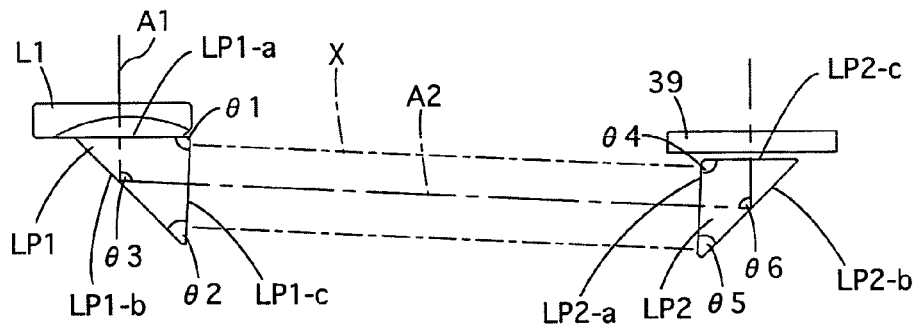
FIG. 4 is a side view schematically showing an imaging optical system and an image sensor of the imaging unit shown in FIGS. 1 through 3.
Figure 5:
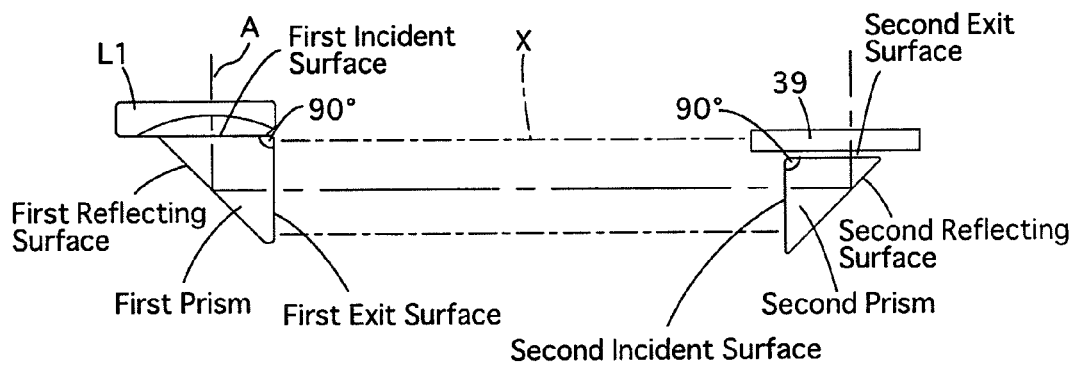
FIG. 5 is a view similar to that of FIG. 4, showing a comparative example to be compared with the optical elements shown in FIG. 4.
Figure 6:
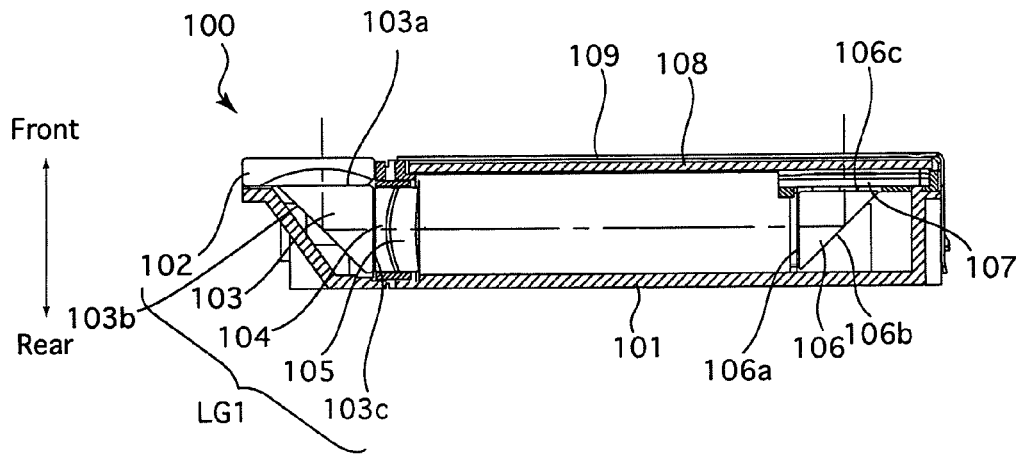
FIG. 6 is a cross sectional view similar to that of FIG. 3, showing an imaging unit of the related art.

Additionally, since the angle of deflection of the object-emanated light by the first reflecting surface LP1-*b* is greater than 90° while the angle of reflection of the object-emanated light by the second reflecting surface LP2-*b* is smaller than 90°, all the effective light rays which emerge from the first exit surface LP1-*c* of the first prism LP1 can be made incident on the second incident surface LP2-*a* of the second prism LP2 even though the first prism LP1 (an end of the first exit surface LP1-*a* on the object side) is positioned closer to the object side (the upper side with respect to FIG. 4) than the second prism LP2 (an end of the second incident surface LP2-*a* on the object side), as shown in FIG. 4 (the aforementioned effective light rays are represented by a reference letter X in FIG. 4; in reality, the light rays varies in diameter depending on the position in the leftward/rightward direction by passing through the lens elements L2, L3 and L4 although illustrated constant at any point in the leftward/rightward direction in FIG. 4 (and in FIG. 5 in the comparative example)). On the other hand, if the first prism (an end of the first exit surface thereof on the object side) is positioned closer to the object side than the second prism (an end of the second incident surface thereof on the object side) with the intersecting angle between the first incident surface and the first exit surface of the first prism set at 90° and with the intersecting angle between the second incident surface and the second exit surface of the second prism set at 90° (with the first exit surface and the second incident surface set to be parallel to the optical axis A1) as shown in FIG. 5 that shows a comparative example (i.e., with the angle of deflection of each of the first reflecting surface and the second reflecting surface set at 90°), part of the effective light rays (see "X" in FIG. 5) which emerge from the first exit surface is intercepted by an end surface of the image sensor 39, thus not being incident on the second incident surface of the second prism.

Additionally, since the rear end of the second prism LP2 is made to contact the base wall 18*a* of the housing 18 with the base wall 18*a* of the housing 18 is formed smaller in thickness than the base wall 12*a* of the holder 12, the entire imaging unit 10 can further be slimmed down.

Although the present invention has been described based on the above illustrated embodiment, various modifications to the above illustrated embodiment are possible.

For instance, although the deflection angle θ3 at the first reflecting surface LP1-*b* is set to 90°+α° and the deflection angle θ6 at the second reflecting surface LP2-*b* is set to 90°−α° in the above illustrated embodiment, it is possible to set the deflection angle θ3 to 90°+α° (i.e., θ3=90°+α° and set the deflection angle θ6 to 90°−β° (i.e., θ6=90°−β°), wherein |β|≠|α| and 5≥β>0. However, in this case also, the magnitudes of α and β should be determined so that the effective light rays which emerge from the first exit surface LP1-*c* of the first prism LP1 are totally incident on the second incident surface LP2-*a* of the second prism LP2.

Additionally, the photographing optical system only needs to be provided with the lens element L1, the first prism LP1 and the second prism LP2; namely, the other optical elements arranged between the first prism LP1 and the second prism LP2 are not indispensable elements for embodying the invention.

Accordingly, the second lens group LG2 and the third lens group LG3 can be omitted, and the number of optical elements arranged between the first prism LP1 and the second prism LP2 can be made one or more than two.

Additionally, a light shield frame can be installed between the first prism LP1 and the second prism LP2 as necessary.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An imaging unit, comprising:
an incident-side optical system on which light rays reflected from a photographic object are incident;
an incident-side prism including a first incident surface which is orthogonal to an optical axis of said incident-side optical system and on which said light rays that are passed through said incident-side optical system are incident, a first reflecting surface which reflects said light rays incident thereon, and a first exit surface from which said light rays reflected by said first reflecting surface emerge;
an exit-side prism including a second incident surface onto which said light rays that emerge from said first exit surface are incident, a second reflecting surface which reflects said light rays incident thereon in a direction toward said photographic object, and a second exit surface from which said light rays reflected by said second reflecting surface emerge; and
an image sensor which faces said second exit surface and receives said light rays that emerge from said second exit surface,
wherein said first incident surface is positioned closer to said photographic object side than said second exit surface, wherein a deflection angle of parallel light rays that travel along and parallel to said optical axis, of said incident-side optical system, at said first reflecting surface is greater than 90°, wherein a deflection angle of said parallel light rays, which are reflected by said first reflecting surface, at said second reflecting surface is smaller than 90°, wherein said deflection angle of said parallel light rays at said first reflecting surface is an angle of 90°+α°, and wherein said deflection angle of said parallel light rays by said second reflecting surface is an angle of 90°−α°.

2. The imaging unit according to claim 1,
wherein an intersecting angle between said first reflecting surface and said first exit surface is an angle of 45°+α°/2, and
wherein an intersecting angle between said second incident surface and said second reflecting surface is an angle of 45°−α°/2.

3. The imaging unit according to claim 1, further comprising:
a housing having an internal space in which said incident-side optical system, said incident-side prism, said exit-side prism and said image sensor are accommodated,
wherein said incident-side prism and said exit-side prism oppose a base wall of said housing in said internal space,
wherein said incident-side optical system is positioned on an opposite side of said incident-side prism from said base wall,
wherein said image sensor is positioned on an opposite side of said exit-side prism from said base wall, and
wherein said parallel light rays which emerge from said first exit surface to travel toward said second incident surface is inclined with respect to said first incident surface in such a manner as to gradually approach said base wall in a direction toward said second incident surface.

4. The imaging unit according to claim 1,
wherein said incident-side optical system comprises a lens element.

5. The imaging unit according to claim 1, further comprising:
at least one optical element between said incident-side prism and said exit-side prism.

6. The imaging unit according to claim 1,
wherein said first exit surface of said incident-side prism and said second incident surface of said exit-side prism lie on planes that are mutually parallel to each other.

7. The imaging unit according to claim 1,
wherein said second reflecting surface of said exit-side prism reflects said light rays incident thereon in a direction parallel to said optical axis toward said photographic object, and
wherein said second exit surface of said exit-side prism lies in a plane that is orthogonal to said optical axis.

* * * * *